United States Patent Office 2,796,376
Patented June 18, 1957

2,796,376
ALKYLENEBISDITHIOCARBAMATES, FUNGICIDAL COMPOSITION CONTAINING SAME AND METHOD OF APPLYING

Oren F. Williams, South Charleston, W. Va., Oscar H. Johnson, Westport, Conn., and Jack R. Graham, St. Albans, W. Va., assignors to Food Machinery and Chemical Corporation, New York, N. Y., a corporation of Delaware No Drawing. Application February 19, 1954,
Serial No. 411,578

4 Claims. (Cl. 167—22)

This invention relates to novel organic chemical compounds, and more particularly to alkylenebisdithiocarbamates and their novel use as fungicides.

These novel compounds have the general formula:

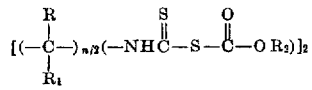

wherein R and $R_1$ may be hydrogen or an organic radical, $R_2$ may be the same or different organic radicals, and $n$ is 1, 2, 3, etc., i. e. a small integer; or the alkylene unit

may be replaced by phenylene or substituted phenylene.

The literature in this field is limited to the disclosure of the preparation of S,S'-biscarbethoxy ethylenebisdithiocarbamate, and the homologues containing, respectively, the tetramethylene, hexamethylene, octamethylene and decamethylene alkylene groups. The prior art contains no reference whatsoever to the use of any of the compounds of this class as a fungicide, or any such related use.

When the known compound, S,S'-biscarbethoxy ethylenebisdithiocarbamate, was formulated in various ways for testing as a fungicide, it was found to be of limited effectiveness, and subsequent investigation showed that this was apparently due to an inherent instability of the compound, resulting in spontaneous decomposition. At room temperature, this decomposition may be complete within a matter of a few days, or even sooner at higher temperatures, but refrigeration inhibits the decomposition. This inherent instability may partially explain the failure of prior art workers to investigate the fungicidal properties of compounds of this class.

It was conceived that the fungicidal properties of this class of compounds could be greatly improved by improving their stability, through chemical modification of the molecular structure, and this was accordingly a principal object of the present invention.

Another object of this invention is the preparation of novel compounds of the class of alkylenebisdithiocarbamates.

Another object of the invention was to prepare novel fungicide compositions containing novel alkylenebisdithiocarbamates.

These and other objects of the invention will be apparent, and better understood, from a consideration of the description herein.

The foregoing and other objects have been realized by the discovery that alkylenebisdithiocarbamate compounds of improved stability and enhanced fungicidal properties are obtained by the substitution of appropriate functional groups and/or elements in certain portions of the molecule. Thus, the placing of a "negative" group in the radical $R_2$ has a pronounced, desirable effect upon the stability and fungicidal characteristics of these compounds. As used herein, a "negative" element or group includes such generally understood examples as: halogen, nitro, sulfonic, carboxy, and others of a similar nature. Again, the nature of the alkylene group has been found to greatly influence these properties. For example, certain compounds containing the ethylene radical have proven to be substantially better as a foliage fungicide than similar compounds containing the propylene or butylene radical.

For example, as indicated above, the compound S,S'-biscarbethoxy ethylenebisdithiocarbamate has a limited effectiveness as a fungicide, and is excessively unstable. However, when a chlorine atom is placed in each of the ethoxy groups, especially in the beta position, yielding the novel compound, S,S'-bis($\beta$-chlorocarbethoxy) ethylenebisdithiocarbamate, it was found then that this novel, modified compound was highly active as a foliage fungicide, and considerably more stable. In further research, it was found that the novel bromine analogue, S,S'-bis-($\beta$-bromocarbethoxy) ethylenebisdithiocarbamate, was even better in those properties, and possessed the important additional advantage of having a very low degree of phytotoxicity.

Where the novel compounds are prepared by modification of the $R_2$ radical in alkoxy derivatives, enhanced stability characteristics are obtained if negative groups are substituted in either the beta, gamma or delta position in the alkoxy ($-OR_2$) portion of the molecule. Also, lengthening and/or branching of the aliphatic carbon chain in the alkoxy portion of the molecule yields carbalkoxy alkylenebisdithiocarbamates of enhanced stability.

The stabilizing effect of a longer aliphatic carbon chain in the alkoxy portion of the molecule was observed in S,S'-bis-carbduodecoxy ethylenebisdithiocarbamate,

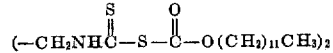

and in S,S'-bis-carboctoxy ethylenebisdithiocarbamate,

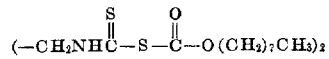

The phenomenon of stabilization of the carbalkoxy alkylenebisdithiocarbamates by branching of the aliphatic chain of the alkoxy portion of the molecule is illustrated in the case of S,S-bis-carbisobutoxy ethylenebisdithiocarbamate,

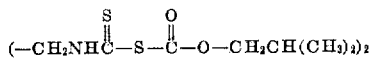

and S,S'-bis-carbisobutoxy hexamethylenebisdithiocarbamate,

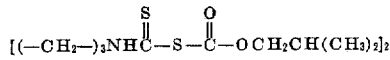

The latter mentioned two carbisobutoxy derivatives are not only more stable than the isomeric straight chain carbbutoxy derivatives, but are also more stable than the carbethoxy derivatives.

Experimental evidence makes it appear highly probable that the high fungitoxicity of the carbalkoxy and carbphenoxy alkylenebisdithiocarbamates is due at least in part to their tendency to undergo slow decomposition in vivo or in situ to an alkylene diisothiocyanate, in the manner illustrated by the following equation:

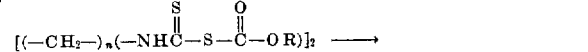
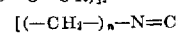

although it is not intended to limit this invention to this theoretical interpretation of the unique effectiveness of these novel compounds.

Where $R_2$ is aliphatic, the hydroxy compound formed by the postulated slow decomposition of the carbalkoxy derivative is an alcohol. Where $R_2$ is an aromatic nucleus, the hydroxy compound liberated is a phenol. Since alcohols, and especially phenols, are known to possess both fungicidal and bactericidal activity, and since phenols and alcohols are believed to possess fungicidal spectra differing from that of the alkylene diisothiocyanates, the carbalkoxy and carbphenoxy alkylenebisdithiocarbamates are believed to be not only novel but highly unusual compositions of matter, in that they are capable of releasing two entirely different types of fungitoxicants. The release of two different types of fungitoxicants differing in their fungicidal specificity is considered highly desirable, since fungi of different species, and frequently fungi of the same species, differ in their response to a given toxicant.

The simultaneous release of two different types of fungitoxic compounds results in fungicidal activity by two different modes of biological action, and the parent compound therefore possesses high fungicidal activity and low fungicidal specificity. The existence in one compound of the properties of both high fungicidal activity and low fungicidal specificity is also of economic importance, since materials possessing these properties are very useful and have a wide range of application in the agricultural chemical field and in other fields such as the prevention of microbioligical deterioration of wood, plastics, paints and fabrics.

The property of the carbalkoxy and carbphenoxy alkylenebisdithiocarbamates of undergoing slow decomposition, with the liberation of the two types of fungitoxicants, has advantages over the use of the fungitoxicants themselves as fungicides, since it appears that a molecular species can possess the above-mentioned desirable fungicidal properties and at the same time undergo decomposition at such a rate that the fungitoxicants are present on the plant in sufficient quantities to kill fungi, but not in sufficient quantity to cause plant injury. Alcohols, phenols, and isothiocyanates are in general very potent fungicides, but in most cases cannot be used on plants because of their phytotoxic properties.

Compounds of this type are prepared by interaction of a chloroformate and the disodium salt of an alkylenebisdithiocarbamic acid in a molar ratio of 2:1. An equation illustrating the general reaction is shown below.

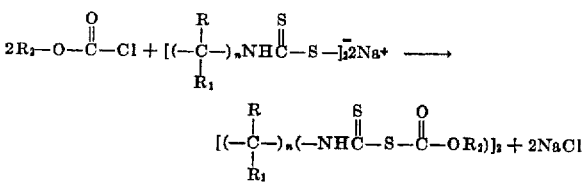

Disodium alkylenebisdithiocarbamates employed as intermediates in the synthesis of the carbalkoxy and carbphenoxy alkylenebisdithiocarbamates were prepared according to the procedure described by Hester in U. S. Patent 2,317,765 or by a modification of this procedure described by Flenner in U. S. Patent 2,609,389. Experimental results obtained indicate that the latter mentioned method for the preparation of the intermediate disodium alkylenebisdithiocarbamates is the preferred procedure.

Chloroformates employed as intermediates in the synthesis of the carbalkoxy and carbphenoxy alkylenebisdithiocarbamates were prepared by phosgenation of alcohols or phenols according to general procedures described in the literature.

The invention will be better understood by consideration of the following examples, which, describing in detail the preparation of numerous novel compounds, are to be considered as exemplary only, and not as limiting the scope of the invention.

EXAMPLE 1

$S,S'$-bis-($\beta$-chlorocarbethoxy) ethylenebisdithiocarbamate

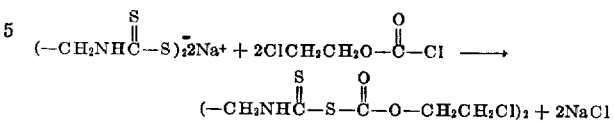

In a 3-neck flask equipped with a mechanical stirrer, a dropping funnel and the thermometer was placed 122 g. of 31.5% aqueous disodium ethylenebisdithiocarbamate solution (0.15 mole). The solution was cooled to 10° C., and with continued stirring and cooling 42.6 g. (0.30 mole) of $\beta$-chloroethylchloroformate was added dropwise. The white amorphous solid which precipitated was filtered and subsequently dried at room temperature in vacuo. The yield of crude material melting with decomposition at 89° C. was 31.2 g. or 50% of theory. A small portion of the crude material recrystallized twice from carbon tetrachloride melted with decomposition at 98–99° C.

*Analysis.*—Calcd. for $C_{10}H_{14}N_2S_4O_2Cl_2$: S, 30.2; Cl, 16.6. Found: S, 30.0; Cl, 17.4.

EXAMPLE 2

$S,S'$-bis-($\beta$-bromocarbethoxy) ethylenebisdithiocarbamate

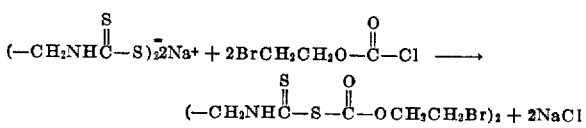

In an apparatus similar to that described in Example 1 was placed 1091 g. (5.82 moles) of $\beta$-bromoethyl chloroformate dissolved in 1091 ml. of carbon tetrachloride cooled at 4° C. With mechanical stirring and continued cooling, 2563 g. of 31.5% aqueous solution of disodium ethylenebisdithiocarbamate (to which had been added 46 g. of Igepal CA 630 surfactant) was added dropwise. The white solid which precipitated was isolated by suction filtration; washed thoroughly with water, methanol, and ether. After drying at room temperature, the product weighed 1255 g. (84.3% of theory) and melted with decomposition at 85–90° C. Recrystallization of a small portion of the crude material gave a solid which melted with decomposition at 95–100° C.

*Analysis.*—Calcd. for $C_{10}H_{14}N_2O_4S_4Br_2$: S, 24.9; Br, 31.1. Found: S, 25.0; Br, 30.8.

EXAMPLE 3

$S,S'$-bis-($\beta,\gamma$-dibromocarbpropoxy) ethylenebisdithiocarbamate

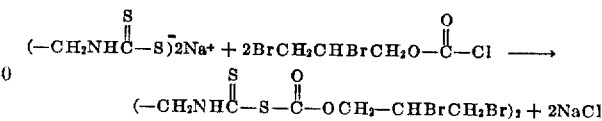

Thirty-seven grams (0.14 mole) of disodium ethylenebisdithiocarbamate was dissolved in 200 ml. of water and the solution transferred to a 3-neck flask equipped with a mechanical stirrer, a dropping funnel and a thermometer. With stirring and cooling to 10° C., 81 g. (0.29 mole) of 2,3-dibromopropyl chloroformate was added dropwise. The light yellow solid which separated was washed with water and methanol and subsequently dried in vacuo at room temperature. The yield was 59 g. (58.3% of theory). The solid melted with decomposition at 84–85° C.

*Analysis.*—Calcd. for $C_{12}H_6N_2S_4Br_4$: S, 18.3; Br, 45.7. Found: S, 18.4; Br, 47.8.

EXAMPLE 4

*S,S'-bis-(β-cyanocarbethoxy) ethylenebisdithiocarbamate*

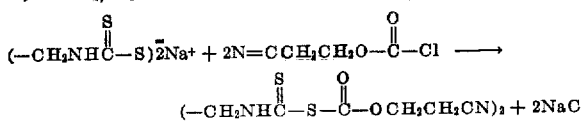

With efficient mechanical stirring, 25 g. (0.19 mole) of β-cyanoethyl chloroformate was added dropwise to a cold (15° C.) solution of 24 g. (0.1 mole) of disodium ethylenebisdithiocarbamate dissolved in 200 ml. water. The light yellow semisolid which precipitated was washed by decantation with methanol and subsequently dissolved in 200 ml. of acetone. After filtering, the acetone solution was diluted with three times its volume of methanol. The white amorphous solid which precipitated was isolated on a suction filter; subsequently washed with ether and finally dried in vacuo at room temperature over calcium chloride. The dry material weighed 12 g. (33.3% of theory) and melted with decomposition at 103–104° C.

*Analysis.*—Calcd. for $C_{12}H_{14}N_4O_4S_4$: S, 31.6. Found: S, 30.9.

EXAMPLE 5

*S,S'-bis-(2-nitro-2-methylcarbpropoxy) ethylenebisdithiocarbamate*

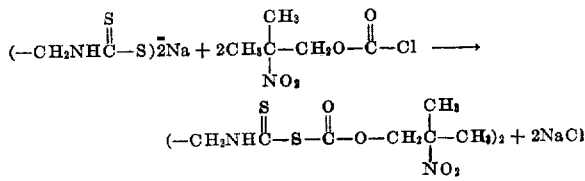

An aqueous solution of disodium ethylenebisdithiocarbamate was prepared by addition of 11.7 g. (0.3 mole) of sodium hydroxide dissolved in 50 ml. water to a suspension of 20 g. (0.15 mole) of β-aminoethyldithiocarbamic acid in 75 ml. water and subsequently adding dropwise with cooling to 20° C. and efficient stirring, 11.4 g. (0.15 mole) of carbon bisulfide. After all of the carbon bisulfide had been added, the solution was allowed to stir at room temperature for three hours. The solution was subsequently cooled to 10° C., and with efficient stirring 54 g. (0.30 mole) of 2-methyl-2-nitropropyl chloroformate added dropwise. A white sticky semisolid separated. The solid mass was isolated from the solution by decantation and stirred in a flask with 100 ml. of methanol. The white granular solid was isolated on a suction filter, washed first with water and then with methanol. After recrystallization from ethyl acetate, the pure product weighed 8.2 g. (10.9% of theory) and melted with gas evolution at 123–125° C.

*Analysis.*—Calcd. for $C_{14}H_{22}N_4S_4O_8$: S, 25.4. Found: S, 24.5.

EXAMPLE 6

*S,S'-bis-(α,γ-dichlorocarbispropoxy) ethylenebisdithiocarbamate*

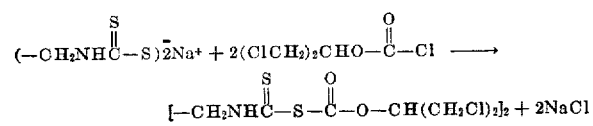

With cooling to 10° C. and efficient mechanical stirring, 29.5 g. (0.16 mole) of α,γ-dichloroisopropyl chloroformate was added dropwise to a solution containing 30 g. (0.12 mole) of disodium ethylenebisdithiocarbamate dissolved in 200 ml. of water. After all of the chloroformate had been added, water was removed by decantation from the white semisolid which formed and 100 ml. of methanol added. Vigorous mechanical stirring caused crystallization of the semisolid material. The white crystalline solid was isolated by suction filtration, washed with water and methanol and dried at room temperature. After recrystallization from carbon tetrachloride the material weighed 8 g. (20% of theory) and melted with decomposition at 115–117° C.

*Analysis.*—Calcd. for $C_{12}H_{16}N_2O_4S_4Cl_4$: S, 24.6; Cl, 27.2. Found: S, 24.4; Cl, 26.2.

EXAMPLE 7

*S,S'-bis(γ-chlorocarbpropoxy)ethylenebisthiocarbamate*

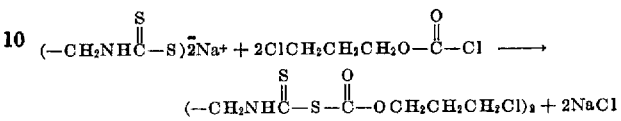

With vigorous mechanical stirring and cooling to 10° C., 15.7 g. (0.10 mole) of γ-chloropropyl chloroformate was added dropwise to 40.6 g. of 31.5% aqueous solution (0.05 mole) of disodium ethylenebisdithiocarbamate. The pale yellow semisolid which separated was converted to a granular white solid by stirring the material with 75 ml. of methanol. After washing with water and again with methanol the material was dried at room temperature in vacuo. The yield of white solid melting at 79° C. with decomposition at 100° C. was 11 g. (48.7% of theory).

*Analysis.*—Calcd. for $C_{12}H_{16}N_2S_4O_4Cl_2$: S, 28.4; Cl, 15.7. Found: S,27.8; Cl,15.5.

EXAMPLE 8

*S,S'-bis-(δ-chlorocarbbutoxy)ethylenebisdithiocarbamate*

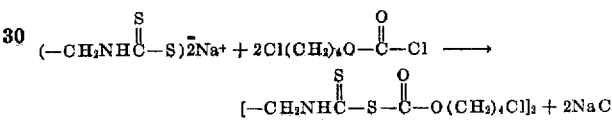

With efficient mechanical stirring and cooling to 10° C., 68.4 g. (0.4 mole) of δ-chlorobutyl chloroformate was added dropwise to 51.2 g. (0.2 mole) of a 31.5% aqueous solution of disodium ethylenebisdithiocarbamate. During the latter part of the addition of the chloroformate, a heavy oil formed. On further stirring, however, the oil solidified. The product was isolated by decantation of the supernatant liquid. The solid was washed thoroughly with methanol and water and dried in air at room temperature. The yield was 61 g. (63% of theory). After recrystallization from carbon tetrachloride, the material melted at 57–60° C. and decomposed at 95–100° C.

*Analysis.*—Calcd. for $C_{14}H_{22}N_2S_4O_4Cl_2$: S, 26.7; Cl, 14.8. Found: S, 26.5; Cl, 14.2.

EXAMPLE 9

*S,S'-bis-(β-chlorocarbpropoxy) ethylenebisdithiocarbamate*

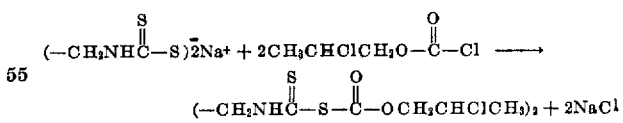

With mechanical stirring and cooling to 10° C., 15.7 g. (0.10 mole) of β-chloropropyl chloroformate was added dropwise to 40.6 g. (0.05 mole) of 31.5% aqueous disodium ethylenebisdithiocarbamate. A thick oil separated after all of the chloroformate had been added. Water was removed from the oil by decantation and methanol added to the oil. Upon addition of methanol the product separated as a white solid. After filtering and drying the solid weighed 7.3 g. (32.2% of theory) and melted at 111° C. with decomposition. When the crude product was recrystallized from carbon tetrachloride two different fractions were obtained. One fraction (A) melted with decomposition at 94–96° C. and the other (B) melted at 114–115° C. with decomposition. Analytical results obtained on the two fractions indicated they were isomers.

*Analysis.*—Calcd. for $C_{12}H_{18}N_2S_4O_4Cl_2$: S, 28.2; Cl, 15.7. Found: (A) S, 27.2; Cl, 16.8. (B) S, 27.9; Cl, 15.8.

EXAMPLE 10

*S,S′-bis-(carboctoxy) ethylenebisdithiocarbamate*

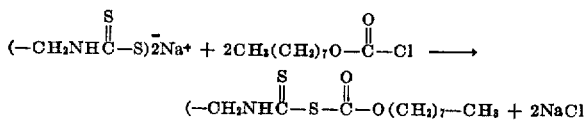

Disodium ethylenebisdithiocarbamate, 81.6 g. (0.10 mole) of 31.5% aqueous solution, was placed in a one liter 3-neck flask and cooled to 10° C. with mechanical stirring. To the stirred solution was added through a dropping funnel 38.5 g. (0.20 mole) of octyl chloroformate. After all the chloroformate had been added the reaction mixture became cloudy. To this solution was added approximately 0.5 ml. of "Atlox" surfactant. Continued stirring produced a white semisolid to which was added 100 ml. of methanol. The mother liquor, was then decanted and the semisolid broken up by stirring with 100 ml. of methanol. The yield of crude product after drying was 22 g. (41.9% of theory). After two recrystallizations from methylcyclohexane the pure material melted with decomposition at 51–53° C.

*Analysis.*—Calcd. for $C_{22}H_{40}N_2S_4O_4$: S, 24.4. Found: S, 24.4.

EXAMPLE 11

*S,S′-bis-(carbisobutoxy) ethylenebisdithiocarbamate*

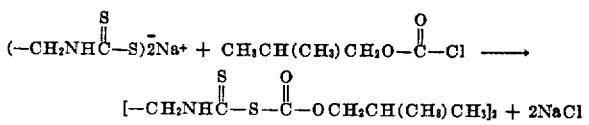

With mechanical stirring and cooling with ice 27.3 g. (0.20 mole) of isobutyl chloroformate was added dropwise to 81.2 g. (0.10 mole) of a 31.5% aqueous solution of disodium ethylenebisdithiocarbamate. After all of the chloroformate had been added, 100 ml. of water was added to aid stirring. Decantation of the liquid portion of the reaction mixture followed by addition of 100 ml. of methanol to the semisolid produced a white finely divided solid. After drying, the yield of the crude product was 29.6 g. (73.8% of theory), M. P. 105–108° C. with decomposition. The product was recrystallized twice from methylcyclohexane.

*Analysis.*—Calcd. for $C_{14}H_{24}N_2S_4O_4$: S, 31.0. Found: S, 31.3.

EXAMPLE 12

*S,S′-bis-(2-chlorocarbcyclohexoxy) ethylenebisdithiocarbamate*

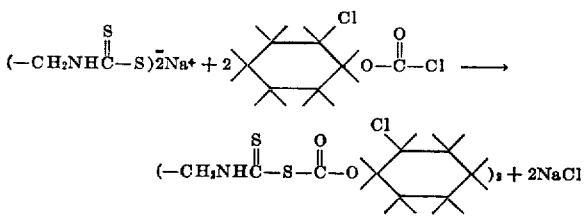

In a 3-neck flask was placed 40.6 g. (0.05 mole) of a 31.5% aqueous solution of disodium ethylenebisdithiocarbamate cooled to 10° C. With stirring 19.7 g. (0.10 mole) of 2-chlorocyclohexyl chloroformate was added dropwise. A white sticky solid precipitated and the entire mass was made to disintegrate to a white amorphous solid by decanting the mother liquor and stirring the precipitate with 50 ml. of methanol. The product was washed with water and methanol and dried yielding 18.0 g. (73% of theory) of crude material. After recrystallization from methylcyclohexane the material melted at 124–125° C.

*Analysis.*—Calcd. for $C_{18}H_{24}N_2S_4O_4Cl_2$: S, 24.1; Cl, 13.3. Found: S, 23.6; Cl, 13.1.

EXAMPLE 13

*S,S′-bis-(o-chlorocarbphenoxy) ethylenebisdithiocarbamate*

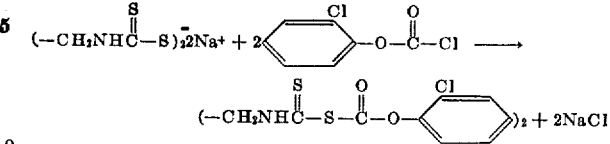

To a cold (10° C.) aqueous solution of disodium ethylenebisdithiocarbamate (40.6 g., 0.05 mole) of 31.5% solution by weight was added slowly with mechanical stirrer 19.1 g. (0.10 mole) of o-chlorophenyl chloroformate. The reaction mixture was stirred vigorously during the addition. The pale yellow plastic mass which precipitated was separated from the aqueous portion of the reaction mixture and stirred with 100 ml. absolute ethanol. Stirring with ethanol caused the plastic mass to change to a white granular solid. The material was isolated on a suction filter, washed thoroughly with water and ethanol and dried in vacuo at room temperature. The yield of crude product melting at 120° C. with decomposition was 13 g. (50% of theory). A portion of the crude material was recrystallized from ethyl acetate.

*Analysis.*—Calcd. for $C_{16}H_{14}N_2S_4O_4Cl_2$: S, 24.6; Cl, 13.6. Found: S, 23.1; Cl, 12.3.

EXAMPLE 14

*S,S′-bis-(m-chlorocarbphenoxy) ethylenebisdithiocarbamate*

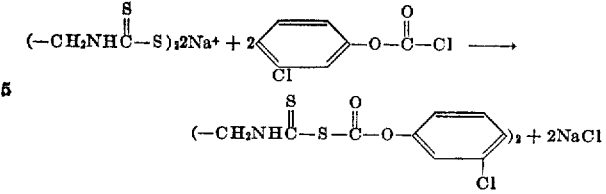

The preparation of S,S′-bis-(m-chlorocarbphenoxy) ethylenebisdithiocarbamate was nearly identical to that described above for the o-chlorocarbphenoxy derivative. From the slow addition of 19.1 g. (0.10 mole) of m-chlorophenyl chloroformate to 40.6 g. (0.05 mole) of a 31.5% aqueous solution of disodium ethylenebisdithiocarbamate was obtained 8 g. (30.8% of theory) of the crude product melting at 123–126° C. with decomposition. A portion of the crude material was recrystallized from carbon tetrachloride.

*Analysis.*—Calcd. for $C_{18}H_{14}N_2S_4O_4Cl_2$: S, 24.6; Cl, 13.6. Found: S, 23.5; Cl, 17.3.

EXAMPLE 15

*S,S′-bis-(p-chlorocarbphenoxy) ethylenebisdithiocarbamate*

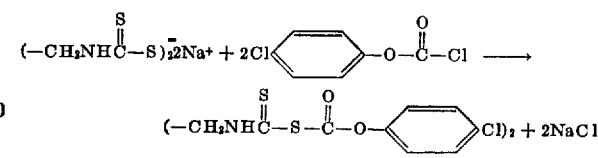

An aqueous solution of disodium ethylenebisdithiocarbamate was prepared by the addition of 11.4 g. (0.15 mole) of carbon bisulfide followed by 11.7 g. (0.30 mole) of sodium hydroxide (in 50 ml. water) to a suspension of 20 g. (0.15 mole) of β-aminoethyldithiocarbamic acid in 100 ml. of water. To the cooled (15° C.) aqueous solution was introduced dropwise, with vigorous stirring, 57.3 g. (0.30 mole) of p-chlorophenyl chloroformate. A pale yellow semisolid which precipitated was broken up by decanting the liquid from the product and stirring the material vigorously with 100 ml. of absolute methanol. The crude product was isolated by suction filtration, washed with methanol and water and dried at room temperature. The yield of crude material melting at 123-125° C. with decomposition was 36 g. (46% of theory). A portion of the crude material was recrystallized from chloroform.

*Analysis.*—Calcd. for C₁₆H₁₄N₂S₄O₄Cl₂: S, 24.6; Cl, 13.6. Found: S, 24.0; Cl, 14.0.

EXAMPLE 16

*S,S'-bis-(2,4-dichlorocarbphenoxy) ethylenebisdithiocarbamate*

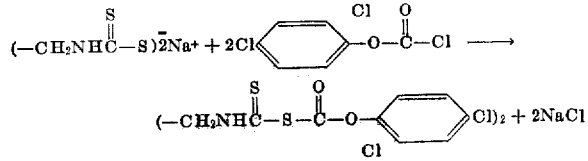

The preparation of S,S'-bis-(2,4-dichlorocarbphenoxy) ethylenebisdithiocarbamate was very similar to that described for the p-chlorocarbphenoxy derivative. Dropwise addition of 67.5 g. (0.30 mole) of 2,4-dichlorophenyl chloroformate to an aqueous solution of disodium ethylenebisdithiocarbamate (0.15 mole) resulted in the formation of a pale yellow semisolid. Washing with methanol caused the semisolid to disintegrate to a white granular powder. After drying at room temperature the yield of crude material melting at 110–115° C. with decomposition was 34 g. (38.7% of theory). A portion of the crude material was recrystallized from chloroform.

*Analysis.*—Calcd. for C₁₆H₁₂N₂S₄O₄Cl₄: S, 21.8; Cl, 24.0. Found: S, 21.0; Cl, 24.6.

EXAMPLE 17

*S,S'-bis-(2,4,5 - trichlorocarbphenoxy) ethylenebisdithiobamate*

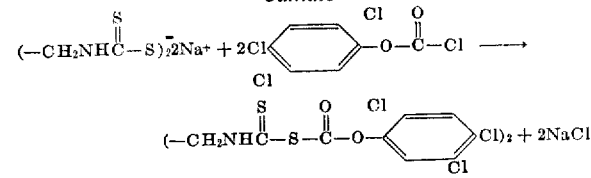

2,4,5 - trichlorophenyl chloroformate, 39.0 g. (0.15 mole) was dissolved in 150 ml. of chlorobenzene. The solution was cooled to 10° C. and 0.075 mole of a 31.5% aqueous solution of disodium ethylenebisdithiocarbamate was added slowly. A white amorphous precipitate appeared and was isolated after one hour of vigorous stirring at room temperature. A crude yield of 38 g. (73% theory) was obtained, M. P. 130 with decomposition. The material was recrystallized from chlorobenzene.

*Analysis.*—Calcd. for C₁₆H₁₀N₂S₄O₄Cl₆: S, 19.5; Cl. 32.3. Found: S, 17.02; Cl, 32.1.

EXAMPLE 18

*S,S'-bis-(nitrocarbphenoxy) ethylenebisdithiocarbamate*

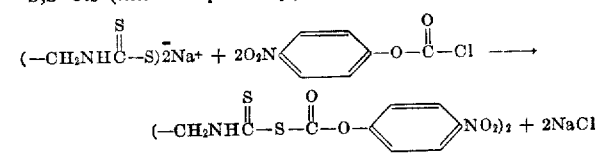

p-Nitrophenyl chloroformate, 25 g. (0.11 mole), was dissolved in 100 ml. of acetone and the solution cooled to 10° C. With efficient mechanical stirring and continued cooling 44 g. of a 31.5% aqueous solution of disodium ethylenebisdithiocarbamate was added rapidly. A white amorphous precipitate formed immediately and after stirring the suspended solid for 10 minutes, the product was isolated by suction filtration. The material was washed thoroughly with water, methanol, and ether and dried at room temperature in vacuo. The yield of pale yellow solid melting at 140–142° C. with decomposition was 18.5 g. (57.2% of theory).

*Analysis.*—Calcd. for C₁₆H₁₄N₄S₄O₈: S, 23.6. Found: S, 22.6.

EXAMPLE 19

*S,S'-bis-(2-methyl-2-nitrocarbpropoxy) trimethylenebisdithiocarbamate*

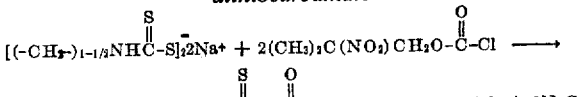

To a stirred aqueous solution of disodium trimethylenebisdithiocarbamate (0.05 mole) cooled to 10° C. was added dropwise 18.1 g. (0.10 mole) of 2-methyl-2-nitropropyl chloroformate. A sticky semisolid which appeared was broken up by stirring with 100 ml. of methanol. The material was isolated on a suction filter, washed thoroughly with water and methanol and dried at room temperature. A crude product melting with decomposition at 94–95° C. and weighing 15 g. (60% of theory) was obtained. The product was further purified by dissolving the crude material in a minimum quantity of acetone, adding methanol to the resulting solution until a faint turbidity appeared and freezing out the product by cooling in a dry ice-acetone bath. The pure material melted at 95–97° C. with decomposition.

*Analysis.*—Calcd. for C₁₅H₂₄N₄S₄O₈: S, 24.9. Found: S, 24.3.

EXAMPLE 20

*S,S' - bis - (β-bromocarbethoxy) hexamethylenebisdithiocarbamate*

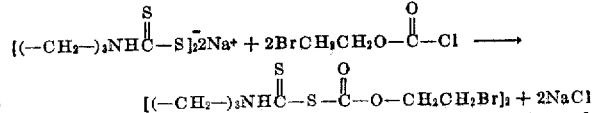

Disodium hexamethylenebisdithiocarbamate, 62.4 g. of a 25% aqueous solution (0.05 mole) was further diluted with 100 ml. water and the solution cooled to 8° C. β-Bromoethyl chloroformate, 18.8 g. (0.10 mole) was then added slowly to the stirred solution resulting in the formation of a white semisolid. Stirring the semisolid in methanol produced a white solid. The crude yield was 21 g. (82.5% of theory) M. P. 73–75° C. (with decomposition at 85–95° C.). A portion of the material was recrystallized from methyl formate.

*Analysis.*—Calcd. for C₁₄H₂₂N₂S₄O₄Br₂: S, 22.5; Br, 28.1. Found: S, 21.6; Br, 27.3.

Whereas the known compound S,S'-biscarbethoxy ethylene bisdithiocarbamate undergoes spontaneous decomposition at room temperature in a matter of 3 to 4 days, most of the compounds contemplated by this invention have been observed to undergo very little, if any, decomposition after standing at room temperature for several months. This increased stability is of great significance in the use of these compounds in the agricultural chemical field. This is because initial effectiveness of these toxicants is not of itself enough to make them commercially useful. In addition, they must have the property of residual activity, preferably over a substantial period of time, so that new generations of pests will be controlled. This requirement makes it clear why these toxicants must have the proper degree of stability for such uses.

Many compounds, including some of those the preparation of which is described in the foregoing examples, were formulated in various ways and tested as fungicides. The carrier powder selected for the formulations may be clay, talc, chalk, wood flour and other generally inert extenders, but should not be of a chemical nature exerting a deleterious effect upon the stability of the alkylenebisdithiocarbamates. These compositions may be used as dry dusting powders, or they may be made, preferably with the inclusion of a wetting agent, for mixing with water or other liquids and applied in the form of a liquid spray.

Illustrative results obtained are presented in Table I below.

TABLE I.—FUNGICIDAL ACTIVITY OF THE CARBALKOXY AND CARBPHENOXY ALKYLENEBISDITHIOCARBAMATES $[(-CH_2-)n(NH\overset{S}{\overset{\|}{C}}-S-\overset{O}{\overset{\|}{C}}-OR_2)]_2$-LD-50-p. p. m.

| $R_2$ | $n$ | Bean Rust | Cucumber Anthracnose | Tomato Blight | |
|---|---|---|---|---|---|
| | | | | Late | Early |
| $CH_3CH_2-$ | 1 | 78 | | | 312 |
| $ClCH_2CH_2-$ | 1 | 20 | | 25 | 54 |
| $BrCH_2CH_2-$ | 1 | <2.4 | | 10 | 30 |
| ⟨phenyl⟩$-CH_2-$ | 1 | >5 | | >78 | 312 |
| $CH_2=CHCH_2-$ | 1 | *Decomposed before testing | | | |
| $N\equiv CCH_2CH_2-$ | 1 | | | | >312 |
| Cl-⟨phenyl⟩-Cl (with Cl) | 1 | 2.4 | | 12 | 19 |
| $ICH_2CH_2-$ | 1 | 9 | | 90 | 312 |
| $CH_2BrCHBrCH_2-$ | 1 | 9 | | 50 | 90 |
| $(CH_3)_2C(NO_2)CH_2-$ | 1 | 4.5 | 4.8 | 5 | 180 |
| $(ClCH_2)_3CH_2-$ | 1 | 3.5 | 4.8 | 5 | 160 |
| Cl-⟨phenyl⟩-Cl | 1 | 11 | 7 | 4.5 | 45 |
| Cl-⟨phenyl⟩ | 1 | 7 | <4.8 | 2.5 | <39 |
| $ClCH_2CH_2CH_2-$ | 1 | <4.8 | 8 | 90 | 55 |
| $ClCH_2CH_2CH_2CH_2-$ | 1 | <4.8 | 20 | | 30 |
| $CH_3CHClCH_2-$ | 1 | <4.8 | 12 | <19 | <19 |
| Cl-tetramethyl phenyl | 1 | <4.8 | 22 | 55 | 85 |
| $CH_3(CH_2)_7-$ | 1 | 25 | 15 | | 20 |
| $O_2N-$⟨phenyl⟩$-$ | 1 | <2.4 | <4.8 | <4.8 | 5 |
| $CH_3$, Cl-⟨phenyl⟩ | 1 | 8.5 | <4.8 | | 25 |
| $CH_3$, Cl-⟨phenyl⟩, $CH_3$ | 1 | <4.8 | 8.0 | | 17 |
| $BrCH_2CH_2-$ | 3 | 19 | | | |
| $(CH_3)_2CHCH_2-$ | 3 | *Decomposed before testing | | | |
| $(CH_3)_2C(NO_2)CH_2-$ | 1.5 | 35 | | | |
| $(CH_3)_2CHCH_2-$ | 1 | *Decomposed before testing | | | |
| $CH_3(CH_2)_{11}-$ | 1 | >19 | | | |
| Parzate | | 4.8 | 15 | 5 | 5 |

* Due to formulation incompatibility, compound per se means stable.

From consideration of the foregoing disclosure, including the examples and other illustrative material therein set forth, it will be obvious to those skilled in the art that the teachings of this invention may be utilized in other forms, all of which may be considered to fall within the scope of the claims below.

That which is claimed as new is:

1. Alkylenebisdithiocarbamates having the general formula:

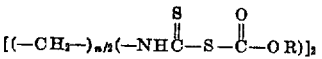

wherein R is a radical selected from the group consisting of alkyl containing at least three carbon atoms, negatively substituted alkyl, monocyclic aryl and substituted monocyclic aryl; and n is a small integer.

2. Fungicidal composition comprising a compound of claim 1 and an inert adjuvant as carrier therefor.

3. Fungicidal composition comprising a compound of claim 1 and an inert powder as carrier therefor.

4. The method of inhibiting and exterminating fungus growths, comprising: applying to the situs of the fungus growth a fungicidal concentration of a composition as defined by claim 2.

References Cited in the file of this patent

UNITED STATES PATENTS 2,317,765    Hester _____ Apr. 27, 1943

OTHER REFERENCES

Yakubovich: J. Gen. Chem. (USSR), vol. 9, (1939), pp. 1777 to 1782.

Dedication 2,796,376.—*Oren F. Williams*, South Charleston, W. Va., *Oscar H. Johnson*, Westport, Conn., and *Jack R. Graham*, St. Albans, W. Va. ALKYLENEBISDITHIOCARBAMATES, FUNGICIDAL COMPOSITION CONTAINING SAME AND METHOD OF APPLYING. Patent dated June 18, 1957. Dedication filed Dec. 11, 1972, by the assignee, *Food Machinery and Chemical Corporation*.

Hereby dedicates to the Public the remaining term of said patent.

[*Official Gazette May 22, 1973.*]